US012600241B2

(12) United States Patent (10) Patent No.: US 12,600,241 B2
Ciupinski et al. (45) Date of Patent: Apr. 14, 2026

(54) PANTOGRAPH CARRIAGE FOR COLLECTION OF ELECTRICITY FROM A FLEXIBLE CABLE

(71) Applicant: Irid Sp. z o.o., Warsaw (PL)

(72) Inventors: Jakub Ciupinski, Lomianki Dolne (PL); Grzegorz Ciupinski, Pruszkow (PL); Andrzej Habryn, Wolbrom (PL); Maciej Ciupinski, Lomianki Dolne (PL)

(73) Assignee: Irid Sp. z o.o., Warsaw (PL)

( * ) Notice: Subject to any disclaimer, the term of this patent is extended or adjusted under 35 U.S.C. 154(b) by 919 days.

(21) Appl. No.: 17/783,288

(22) PCT Filed: Dec. 8, 2020

(86) PCT No.: PCT/IB2020/061630
§ 371 (c)(1),
(2) Date: Jun. 8, 2022

(87) PCT Pub. No.: WO2021/116903
PCT Pub. Date: Jun. 17, 2021

(65) Prior Publication Data
US 2023/0018186 A1 Jan. 19, 2023

(30) Foreign Application Priority Data
Dec. 9, 2019 (PL) .......................................... 432151

(51) Int. Cl.
*B60L 5/06* (2006.01)
*B60L 5/36* (2006.01)
*B60L 5/40* (2006.01)
(52) U.S. Cl.
CPC .................. *B60L 5/06* (2013.01); *B60L 5/36* (2013.01); *B60L 5/40* (2013.01)

(58) Field of Classification Search
CPC ...... B60L 5/06; B60L 5/08; B60L 5/36; B60L 5/40
See application file for complete search history.

(56) References Cited

U.S. PATENT DOCUMENTS 446,833 A 2/1891 Hunter
2,986,954 A * 6/1961 Werner ................... F16H 55/26
74/567
(Continued)

FOREIGN PATENT DOCUMENTS

CH 712610 12/2017
CH 712610 A2 * 12/2017 ............. B60M 1/20
(Continued)

OTHER PUBLICATIONS

Decision to Grant A Patent Dated Aug. 10, 2021 From the Urzad Patentowy Rzeczypospolitej Polskiej [Patent Office of the Republic of Poland] Re. Application N. 432151. (2 Pages).
(Continued)

*Primary Examiner* — Jason C Smith

(57) ABSTRACT

The subject of the invention is a pantograph carriage for collection of electricity from a flexible cable (2), containing at least two conductor wires (3), partially moulded into a flexible screen, which forms flexible lips (2a) in the uncovered part of conductor wires, wherein the carriage is provided with a load bearing element (11) equipped with at least two load bearing rollers (7, 14, 16), with at least one roller rolling across the top surface of the flexible cable (2), characterised in that it contains at least two sliding drivers (6) attached to the load bearing element (8, 11), which in their working position enter spaces between the flexible lips (2a) of the cable (2) and touch the conductor wires (3) with their sliding surfaces, wherein at least one opening element (1, 4, 5) is provided in order to open the flexible lips (2a) of
(Continued)

the cable (2) in order to form a space, where the sliding drivers (6) enter.

14 Claims, 12 Drawing Sheets

(56) References Cited

U.S. PATENT DOCUMENTS

| | | | | | |
|---|---|---|---|---|---|
| 4,053,035 | A | * | 10/1977 | Uchiyama | B60L 5/08 |
| | | | | | 104/93 |
| 4,245,726 | A | * | 1/1981 | Kohler | B60M 1/34 |
| | | | | | 439/38 |
| 4,278,381 | A | * | 7/1981 | Blomquist | B23Q 7/1431 |
| | | | | | 414/349 |
| 5,051,546 | A | * | 9/1991 | Bormann | B60L 5/36 |
| | | | | | 104/89 |
| 9,056,558 | B2 | * | 6/2015 | Zimmerman | B60M 1/12 |
| 2013/0192944 | A1 | * | 8/2013 | Zimmerman | B60M 1/14 |
| | | | | | 191/38 |
| 2023/0018186 | A1 | * | 1/2023 | Ciupinski | B60L 5/36 |

FOREIGN PATENT DOCUMENTS

| | | | | |
|---|---|---|---|---|
| CN | 108544926 | | 9/2018 | |
| DE | 102006027906 | | 12/2007 | |
| DE | 102006027906 | A1 * | 12/2007 | B60M 1/34 |
| EP | 3498519 | | 6/2019 | |
| EP | 3498519 | A1 * | 6/2019 | B60L 5/39 |
| GB | 398602 | | 9/1933 | |
| GB | 398602 | A * | 9/1933 | B60M 1/34 |
| JP | 53-073707 | | 6/1978 | |
| KR | 10-2017-0026120 | | 3/2017 | |
| PL | 238857 | | 10/2021 | |
| RU | 180674 | | 6/2018 | |

OTHER PUBLICATIONS

International Search Report and the Written Opinion Dated Mar. 26, 2021 From the International Searching Authority Re. Application No. PCT/IB2020/061630. (15 Pages).

* cited by examiner

PANTOGRAPH CARRIAGE FOR COLLECTION OF ELECTRICITY FROM A FLEXIBLE CABLE

RELATED APPLICATIONS

This application is a National Phase of PCT Patent Application No. PCT/IB2020/061630 having International filing date of Dec. 8, 2020, which claims the benefit of priority of Polish Patent Application No. PL432151 filed on Dec. 9, 2019. The contents of the above applications are all incorporated by reference as if fully set forth herein in their entirety.

FIELD AND BACKGROUND OF THE INVENTION

The subject of the invention is a pantograph carriage intended for mobile, continuous transfer of electricity from a flexible cable to an electric receiver, for example, a gantry crane, a trolleybus or another vehicle, simultaneously ensuring small offset resistance and secure electric coupling. The carriage according to the invention guarantees safe contact power supply of mobile electric receivers moving along designated routes, for example, buses (trolleybuses), suspended and cable transport carriages, loaders in mines, automatic systems for crop handling and harvest in agriculture, self-propelled cranes, gantry cranes, transport carriages, etc., also under field conditions and in temporary use, for example, at construction sites or on agricultural fields and in orchards.

The commonly used system of contact-based, wired power supply for vehicles, such as tramways, railway engines, trolley buses, metro usually takes place using top, uninsulated power lines, from which power is drawn using pantographs, inclined pantographs or, particularly in the case of trolley buses, using pantographs with contact shoes. Metro systems commonly use the so-called third rail as their power supply. Power supply provided by rigid conductors preceded power supply using flexible power supply lines. Metal pipes with a ca. 20-25 cm diameter, with a slit provided at their bottom, were one of the early forms of overhead power supply systems. The moving vehicle pulled a core moving inside the pipes, to which the vehicle was connected via a flexible cable. A two-pole power supply system provided by two parallel pipes was usually used. The pipes were attached to carrier ropes. The system was developed by Siemens and presented for the first time during the International Exposition of Electricity in Paris, in 1881. Rigid conductors were used for the first time within a national railway network in the city centre line Baltimore Belt Line of Baltimore & Ohio Railroad (USA) and was used for a short period of time following electrification in 1895. A Z-shaped metal profile was used as the traction cable, and the engines were provided with special receivers (followed by introduction of the so-called "third rail"). Power supply provided from the overhead lines had to be rather complicated initially, e.g. the system by Charles J. Van Depoele, in which electricity was collected using a trolley encompassing the line with its side rollers (American patent publication U.S. Pat. No. 336,453). Despite the fact that such receivers were quickly replaced by newer and more effective designs, they were the origin of one of two American names for tramways—the trolley.

Power supply from overhead lines became much more simple after the discovery of a trolley pole (Frank J. Sprague, used within the tramway line Franklin Street Railway in Richmond, 1888) and a contact pole, e.g. an inclined pole (Bügelstromabnehmer, Werner von Siemens, ca. 1890). A pole with a contact did not have to look like a lyre, it could also be rectangular (e.g. used within the Stockholm-Djursholm line, in three-phase lines—a design with additional frames, they were also used until recently in tramways in Rome). The trolley pole and the contact pole technology were related through a common idea—the contact between the pole and the driving line was to be realized thanks to the flexible design of the pole itself. As we have already mentioned, however, both technologies required different types of overhead lines. The invention of a pantograph, dating back to the early 20th century, seemingly had no significant influence on the shape of the overhead lines adapted to contact poles.

Before it was used within trolleybus lines, the two-pole power supply (two overhead lines) was used in some tramway networks, if the city did not approve power supply rails for the purpose, e.g. In Tokyo, Cincinnati, Havana (two-pole power supply systems). One of the variants included power supply without the so-called "zero" line, e.g. used in the Tábor-Bechyně railway line in Czechia (Frantšek Křižík): with one line operating at +700 V, the other at −700 V.

Document US446833A provides a suitable construction adapted to be suspended or overhead conductors for electric railways, whereby strength, durability, simplicity, and low resistance result with cheapness of construction. In this disclosure there is suspend one or more supporting and current-supplying conductors or cables, and from it or them there are suspended the working conductor or conductors, which are hung substantially parallel to the rail, at a fixed distance from the track.

Document GB398602A provides a guard for a live rail. It consists of two strips of steel. Normally, in contact, and adapted to be separated by a sliding collector and to close behind the latter. The strips are carried by spring supports which may be covered with a layer of flexible insulating material extending along all the supports to form a lateral guard for the rail.

Document DE102006027906A1 discloses a current collector with two pair of current collector rolls arranged in series and arranged together in a flat angle, where edges of the rolls have a positive semicircular section Document CH712610A2 discloses a driving line for non-rail-bound electric vehicles, in which the driving line is used as a conductor pair of spaced horizontal wires mounted opposite driving is done, one for the inner tap of the voltage suitable contact gap, and wherein the current collector for use in the contact gap of the catenary an upwardly tapered shape and consisting of an insulating body, the two dissipation cables, carbon or graphite shoes for contact with the driving wires, wherein the tip of the pantograph the driving wires.

Document US 2013/192944 A1 discloses a vehicle, which connects to an overhead power structure for powering and guiding the vehicle. The overhead power structure includes a trolley, a track along which the trolley runs, a power source connected to the track, and a cable connected to the trolley and is configured to attach to the vehicle moving on a surface.

Document EP3498519A1 discloses a current collecting device for a train, comprising a collector arm and a current reflux arm connected with a bogie.

Demand for new pantograph carriages intended for smooth transfer of electricity from a flexible cable to an electric receiver, which could be used in contact-type power supply systems for vehicles, such as tramways, railway engines, trolleybuses, metro vehicles, suspended and line transport carriages still exists in the field, also in field conditions and in temporary use scenarios.

Thus, the objective of this invention was to develop a design of a pantograph carriage intended for mobile, continuous transfer of electricity from a flexible cable to an electric receiver.

SUMMARY OF THE INVENTION

Thus, the objective of the invention is a pantograph carriage for collection of electricity from a flexible cable, containing at least two conductor wires, partially moulded into a flexible screen, which forms flexible lips in the uncovered part of conductor wires, wherein the carriage is provided with a load bearing element equipped with at least two load bearing rollers, with at least one roller rolling across the top surface of the flexible cable, characterised in that it contains at least two sliding drivers, which in their working position enter spaces between the flexible lips of the cable and touch the conductor wires with their sliding surfaces, wherein at least one opening element is provided in order to open the flexible lips of the cable in order to form a space, where the sliding drivers enter.

The opening element is preferably formed as a plate with a blade, with an edge parallel to the longitudinal axis of the cable, which with the blade inserted between the flexible cable lips is turned around an axis perpendicular to the plate blade edge, forming space into which the sliding drivers may enter.

The opening element is preferably a wedge, which inserted between the flexible cable lips forms a space, into which the sliding drivers may be inserted.

The opening element is preferably a rotary disc rotating around an axis perpendicular to the plane passing through longitudinal axes of conductor wires, such that blades of the rotary disc enter between the flexible cable lips, forming space for sliding drivers present on the rotary disc, on the side of the blade opposite to the rotation axis of the rotary disc, and the sliding drivers contact the conductor wires.

There are preferably at least two opening elements for the conductor wire, separated at a certain distance along the flexible cable.

Scissor arms with load bearing rollers are preferably attached to the load bearing element.

The load bearing element preferably includes a straight bar with its longitudinal axis perpendicular to the longitudinal axis of the flexible cable and parallel to a plane passing through longitudinal axes of conductor wires, wherein two symmetrically movable load bearing roller supports are moving along its longitudinal axis and are placed such that load bearing rollers are placed at the ends of the supports, such that roller surfaces touch the top surface of the flexible cable once the supports are fully moved in, and when moved out, the entire carriage may be moved downwards.

The load bearing element preferably includes a rigid frame with a U-shape in the cross-section towards the longitudinal axis of the flexible cable, wherein bars comprising axes of load bearing rollers are attached as rotary elements at the ends of the rigid frame arms, rotating around axes parallel to the longitudinal axis of the flexible cable, wherein in the vertical position of these bars with load bearing elements it is possible to move the entire carriage downwards, and after bar rotation together with the load bearing rollers towards the flexible cable, load bearing roller surfaces touch the top surface of the flexible cable.

The load bearing element preferably includes a divided and separable frame with a fixed part and a movable bar, wherein axes with load bearing rollers are provided at free ends of arms of both parts, such that once the bar is moved outwards from the frame, the entire carriage may be moved down and when pressed together, the load bearing roller surfaces touch the top surface of the flexible cable.

The load bearing roller may be preferably driven rollers or idle rollers.

The carriage is preferably suspended on four symmetric sets of driven load bearing rollers and idle load bearing rollers, with two rollers opposite one another, on both sides of the flexible cable, wherein distances between the terminal and neighbouring sets are at least twice as small as between the inner sets.

The carriage is preferably suspended on the top load bearing rollers pressed against the flexible cable by the bottom pressing rollers, wherein the bottom pressing rollers may be driven rollers or idle rollers.

The load bearing roller is preferably a toothed wheel used to transfer power from the carriage to the flexible cable using tracks tensioned between toothed wheels, wherein the tracks move symmetrically along the longitudinal axis of the flexible cable, along the surface of the flexible cable.

The drive of the pantograph carriage is preferably realized using toothed wheel meshing with the toothed strip integrated into the special, flexible cable and placed on its surface.

BRIEF DESCRIPTION OF THE SEVERAL VIEWS OF THE DRAWINGS

The pantograph carriage for collection of electricity from a flexible cable is presented in embodiments in the figures, where.

Figure 1:
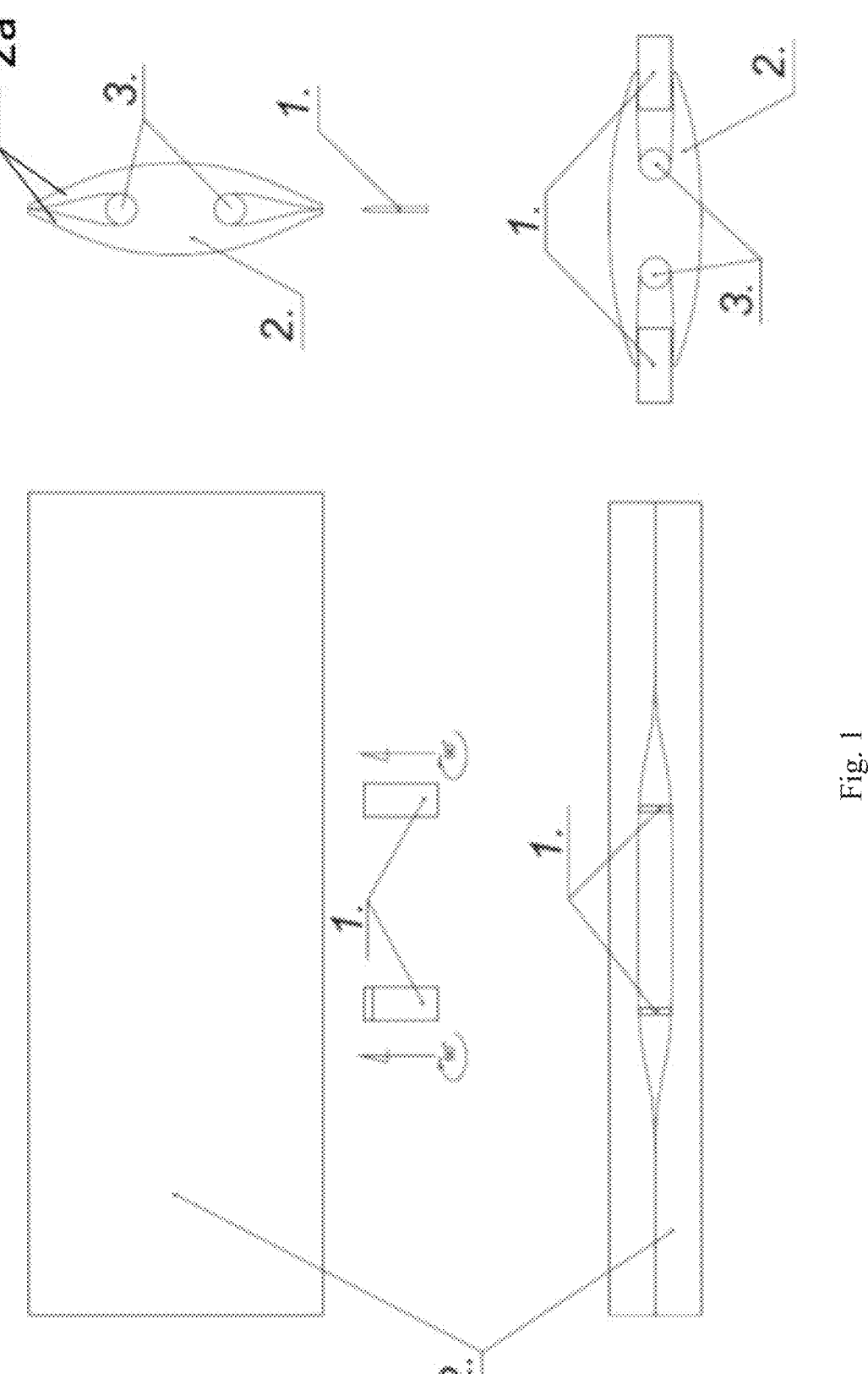
FIG. 1 presents a functional diagram of opening elements in the form of plates 1.

LIST OF REFERENCES 1 plate
2 flexible cable
2a flexible lips
3 conductor wire
4 wedge
5 disc
6 sliding driver
7 driven roller
8 scissor arms
9 straight bar
10 roller support
11 load bearing element
12 fixed part of the movable frame
13 movable bar
14 idle roller
15 bottom pressing roller
16 toothed wheel
17 track
18 toothed strip.

DESCRIPTION OF SPECIFIC EMBODIMENTS OF THE INVENTION

Examples

Figure 12:
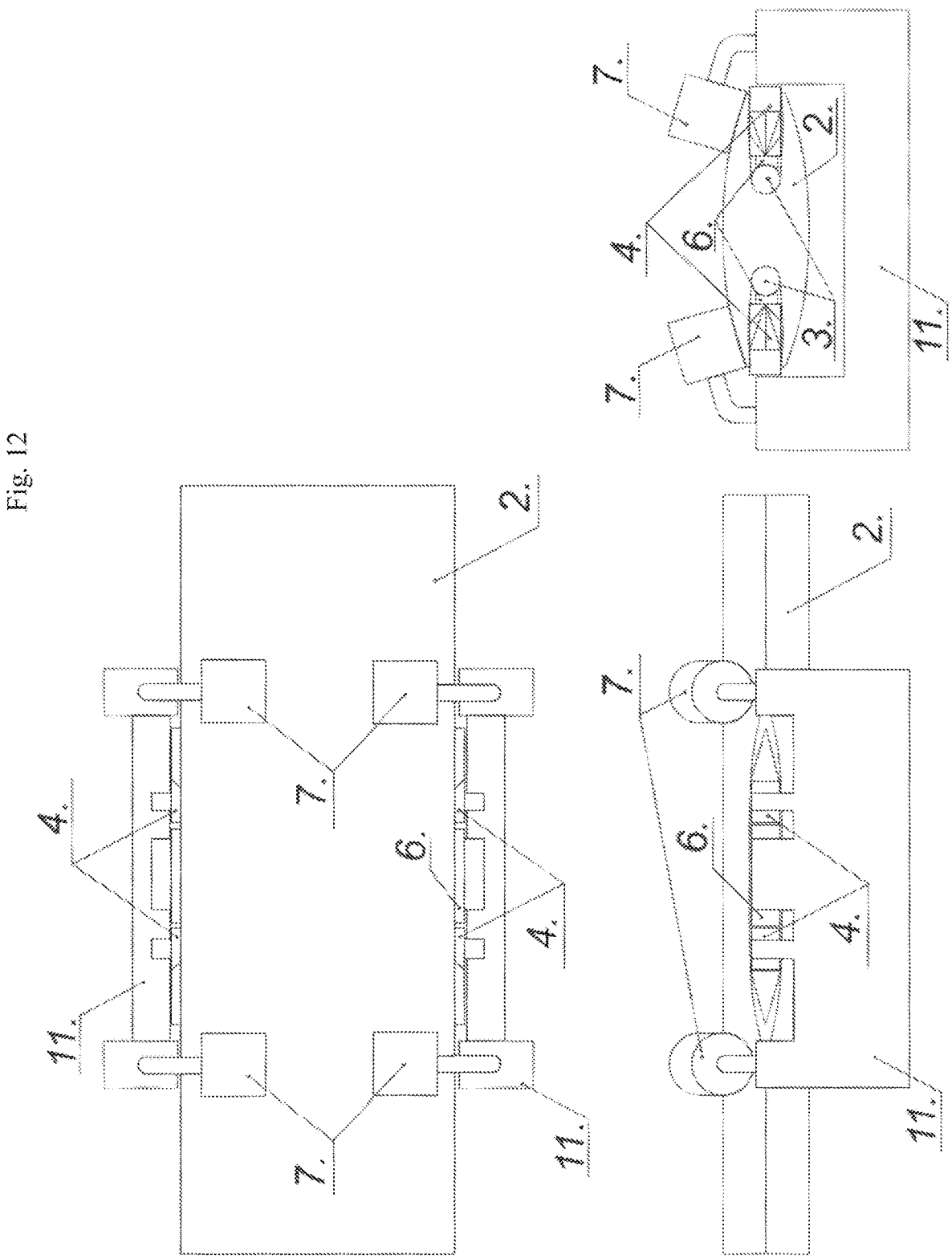
FIG. 12 presents a complete pantograph carriage according to the invention.

FIG. 12 presents a complete pantograph carriage according to the invention, showing the flexible cable 2, conductor wire 3, wedges 4, sliding drivers 6, driven rollers 7 and the load bearing element 11.

FIG. 1 presents the functional diagram of opening elements in the form of plates 1, which in their horizontal position are sliding in pairs, at a distance L, between the flexible lips 2a of the flexible cable 2 and are subsequently rotated vertically, around an axis perpendicular to the blade edge, forming a window, in which the sliding drivers may be placed.

Figure 2:
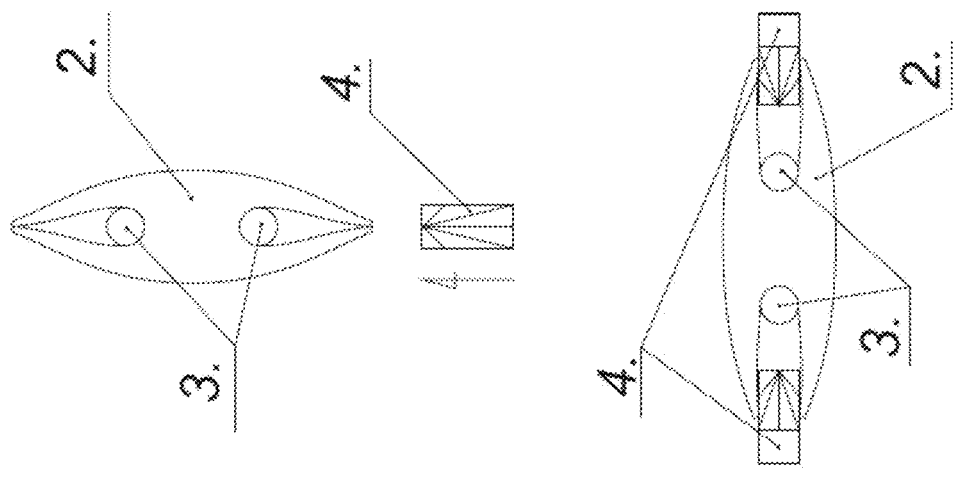
FIG. 2 presents a functional diagram of opening elements in the form of wedges 4 with blades.
Figure 2:
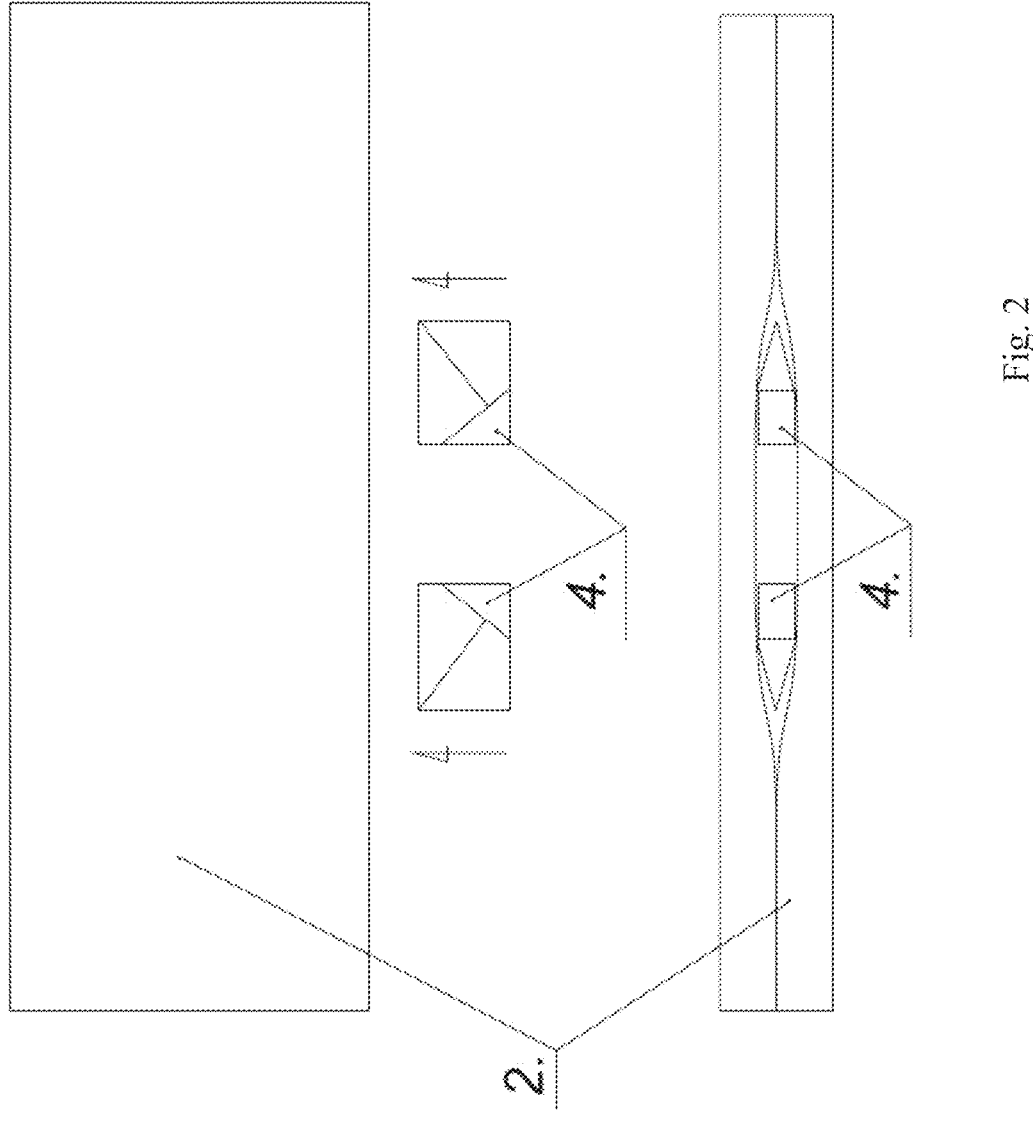

FIG. 2 presents the functional diagram of opening elements in the form of wedges 4 with blades, with said wedges 4 separated at a distance L along the flexible cable 2 and rotate around axes perpendicular to the plane passing through longitudinal axes of conductor wires 3, such that wedge blades 4 enter the space between the flexible lips 2a of the flexible cable 2, forming space for sliding drivers 6.

Figure 3:
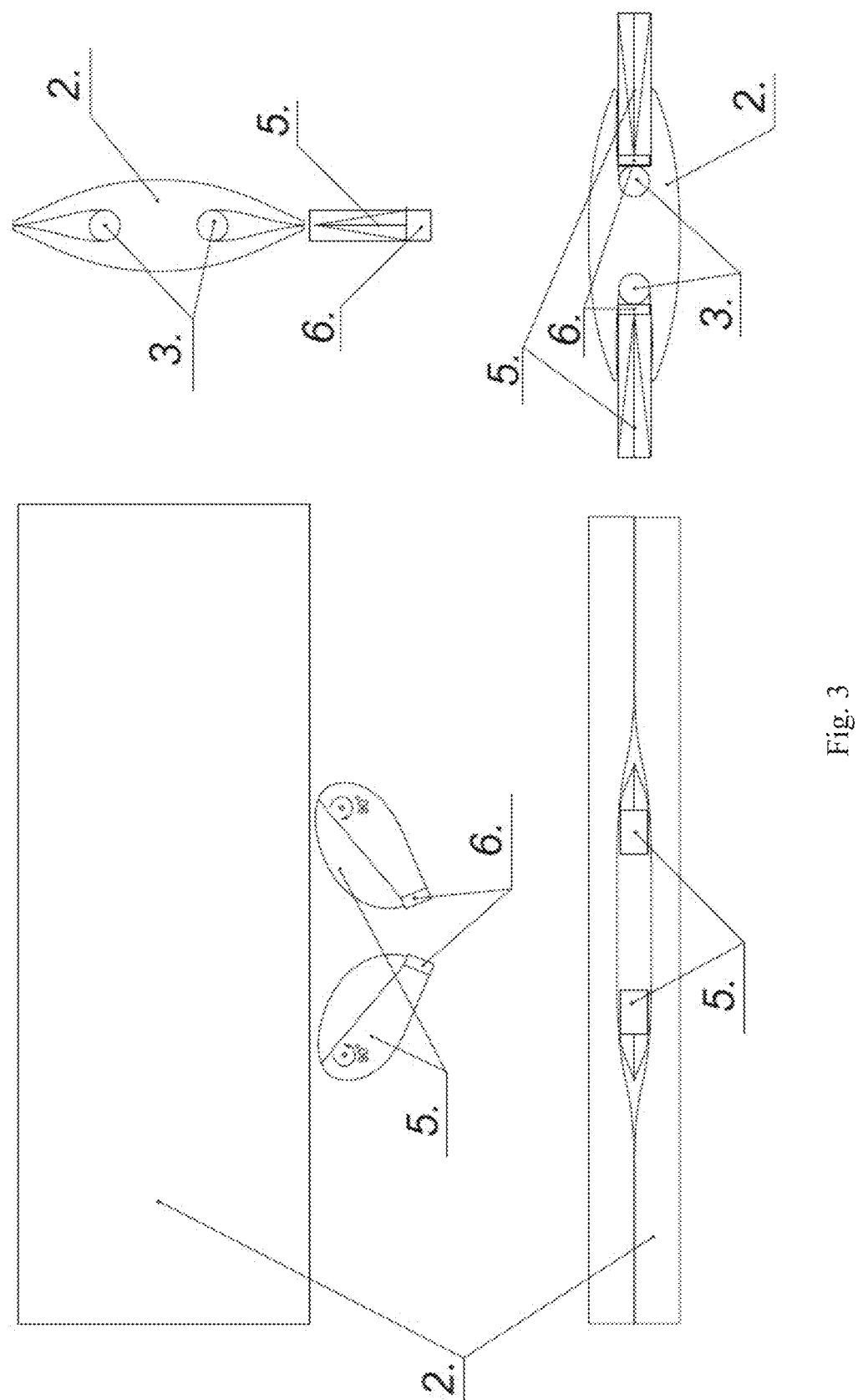
FIG. 3 presents a functional diagram of opening elements in the form of discs 5 with blades.

FIG. 3 presents the functional diagram of opening elements in the form of discs 5 with blades, wherein the discs 5 rotate around axes perpendicular to the plane passing through the longitudinal axes of conductor wires 3, such that blades of the discs 5 enter between the flexible lips 2a of the flexible cable 2, forming space for sliding drivers 6 present on the disc 5, on the side of the blade opposite to the rotation axis of the disc, and the sliding drivers contact 6 the conductor wires 3.

Figure 4:
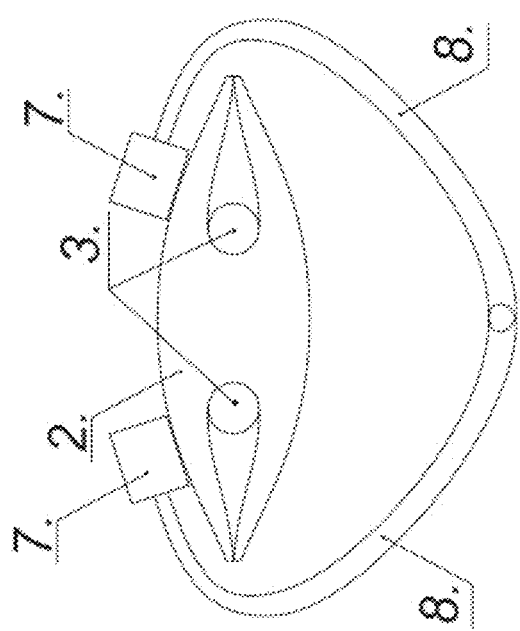
FIG. 4 presents a functional diagram of scissor arms 8 of the carriage according to the invention, with load bearing rollers of the carriage 7 installed in bearings on arm ends.
Figure 4:
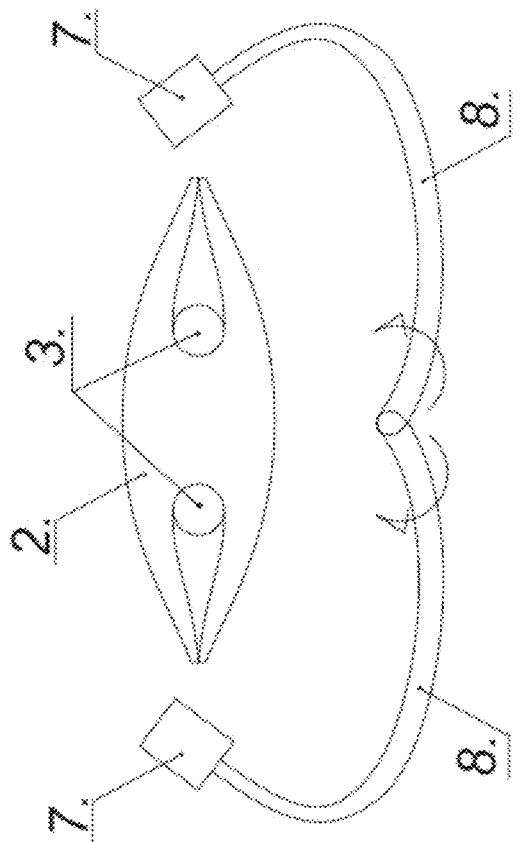

FIG. 4 presents a functional diagram of scissor arms 8 of the carriage according to the invention, with load bearing rollers 7 of the carriage installed in bearings on arm ends. In the unattached position of the carriage, the scissors arms 8 are rotatably connected to the rotation axis parallel to the longitudinal axes of the flexible cable 2 and symmetrical to conductor wires 3, while on the ends of the scissor arms 8 opposite to the rotation axis, driven rollers 7 of the carriage 7 are installed in bearings, at least transferring weight loads of the carriage onto the elastic cable 2, wherein axes of these driven rollers 7 of the carriage are located such that surfaces of driven rollers 7 touch the top surface of the flexible cable 2 after rotation of the scissor arms 8 around the rotation axis.

Figure 5:
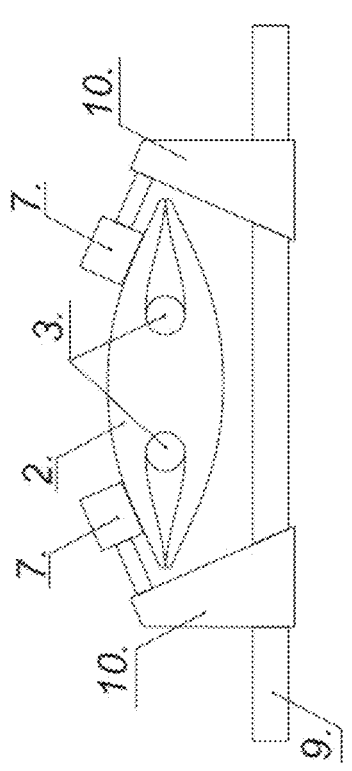
FIG. 5 shows how the carriage is attached, if the carriage is provided with a straight bar 9 with its axis perpendicular to the longitudinal axis of the flexible cable 2 and parallel to the plane passing through longitudinal axes of conductor wires 3.
Figure 5:
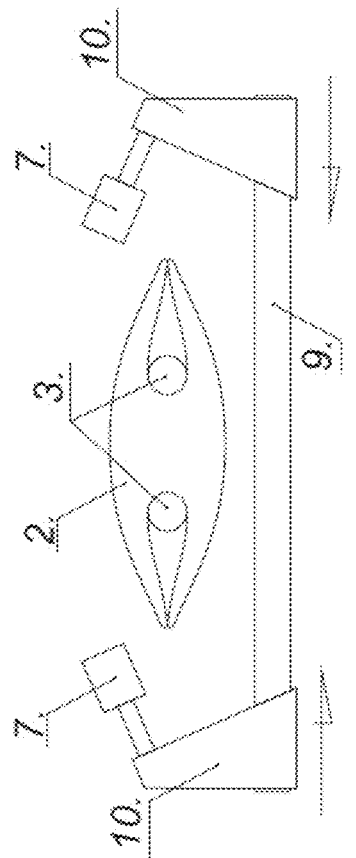

FIG. 5 presents the attachment of the carriage according to the invention, if the carriage is provided with a straight bar 9 with its axis perpendicular to the longitudinal axis of the flexible cable 2 and parallel to the plane passing through longitudinal axes of conductor wires 3, wherein two symmetrical, movable supports 10 of load bearing rollers move along its longitudinal axis, wherein driven rollers 7 are installed in bearings at the ends of supports, placed such that after the supports 10 are fully moved in, surfaces of the driven rollers 7 touch the top surface of the flexible cable 2, and after the supports are moved out, the entire system may be moved downwards.

Figure 6:
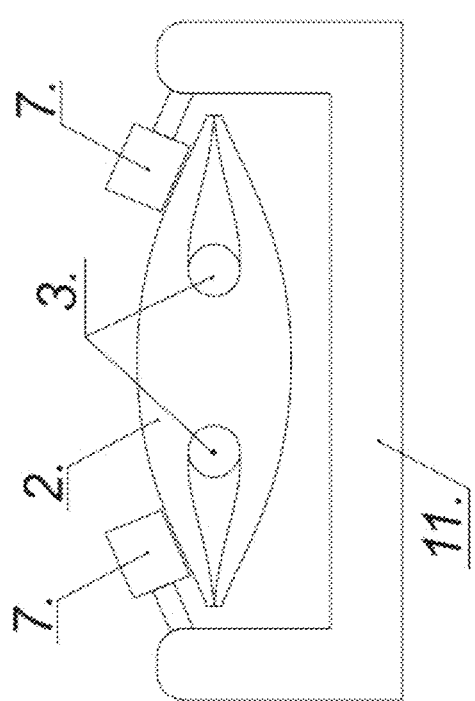
FIG. 6 shows how the carriage is attached, with the carriage provided with a rigid carriage frame 11, U-shaped in its cross-section perpendicular to the longitudinal axis of the flexible cable 2.
Figure 6:
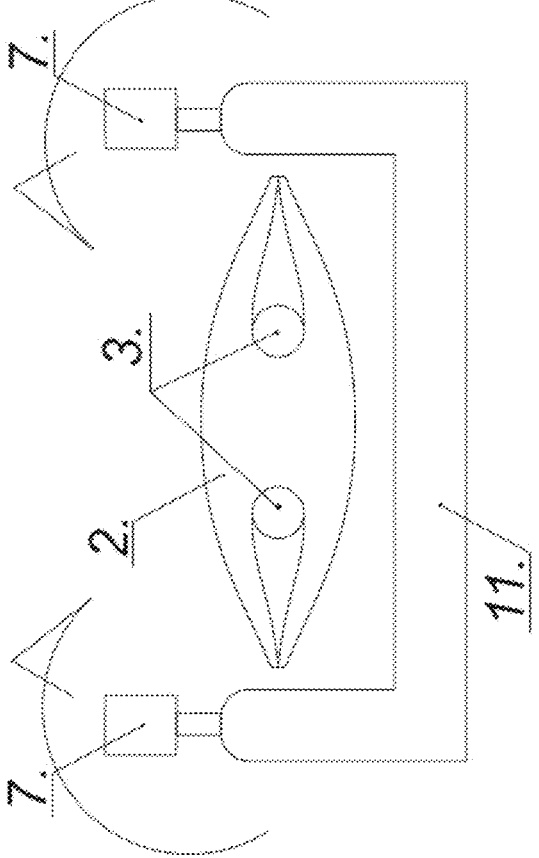

FIG. 6 presents the attachment of the carriage provided with a rigid load bearing element 11 of the carriage, with a U-shape in the cross-section towards the longitudinal axis of the flexible cable 2, wherein two bars comprising axes of the driven rollers 7 are attached as rotary elements at the ends of the arms of the load bearing element 11, wherein in the vertical position of these bars with driven rollers 7 it is possible to move the entire system downwards, and after bar rotation together with the driven rollers 7 with the rollers 7 oriented towards the flexible cable 2, the surfaces of rollers 7 touch the top surface of the flexible cable 2.

Figure 7:
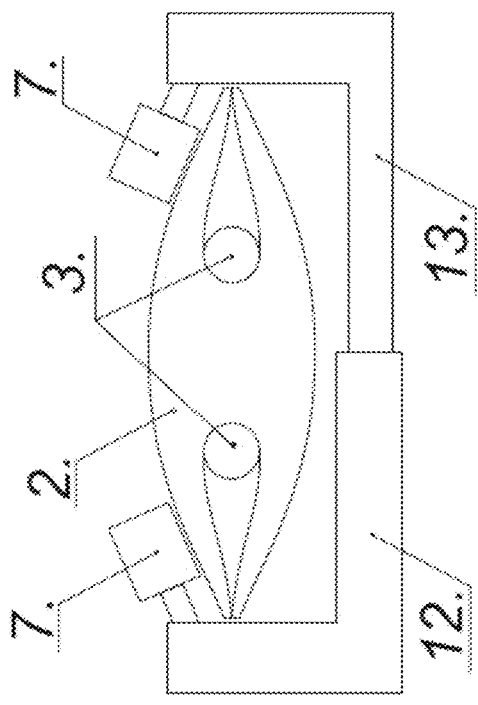
FIG. 7 shows how the carriage is attached, with the carriage provided with a divided, movable carriage frame with a fixed part—fixed carriage frame 12 and a movable bar 13.
Figure 7:
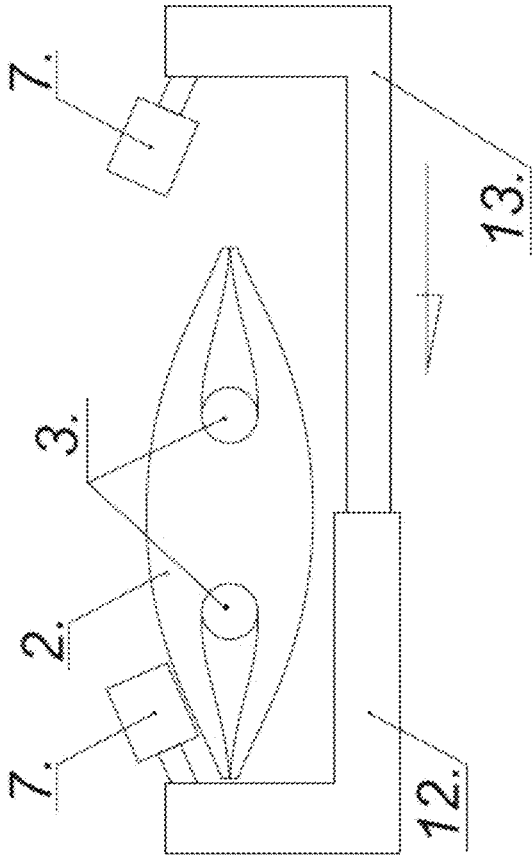

FIG. 7 presents the attachment of the carriage according to the invention, provided with a split, movable carriage frame with a fixed frame 12—fixed carriage frame and a movable bar 13, and both these parts together have the U-shape in the cross-section perpendicular to the longitudinal axis of the flexible cable 2, wherein axes with driven rollers 7 are placed at the ends of free edges of both frames, such that once moved outside the movable bar 13 against the fixed frame 12, it is possible to move the entire system downwards, and once moved inside, the surfaces of driven rollers 7 touch the top surface of the flexible cable 2.

Figure 8:
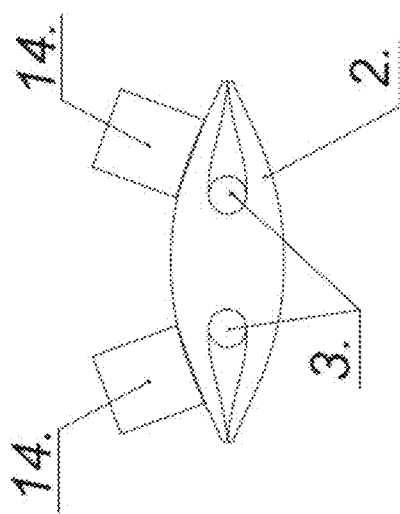
FIG. 8 shows how the carriage is suspended on four symmetrical sets of driven rollers 7 and idle rollers 14.
Figure 8:
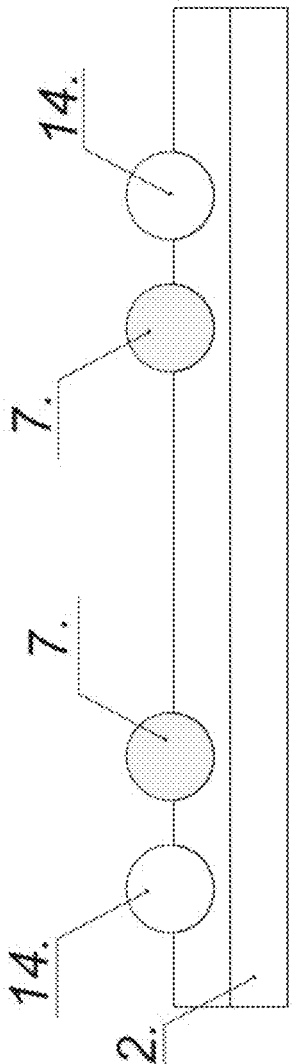

FIG. 8 presents the attachments of the carriage according to the invention, on four symmetric sets of driven rollers 7 and idle rollers 14, with two rollers opposite one another, on both sides of the flexible cable 2, wherein distances between the terminal and neighbouring sets are at least twice as small as between the inner sets.

Figure 9:
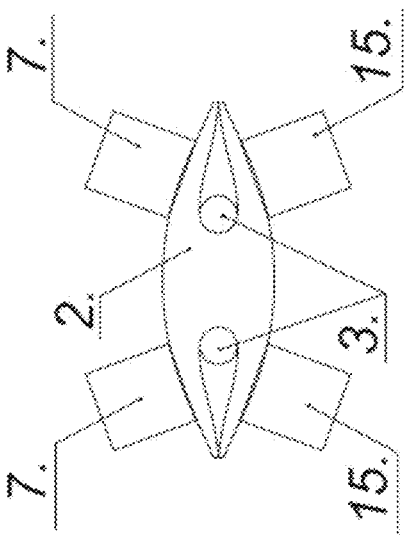
FIG. 9 presents the carriage suspension system with top load bearing, driven rollers 7 and with bottom pressing rollers 15.
Figure 9:
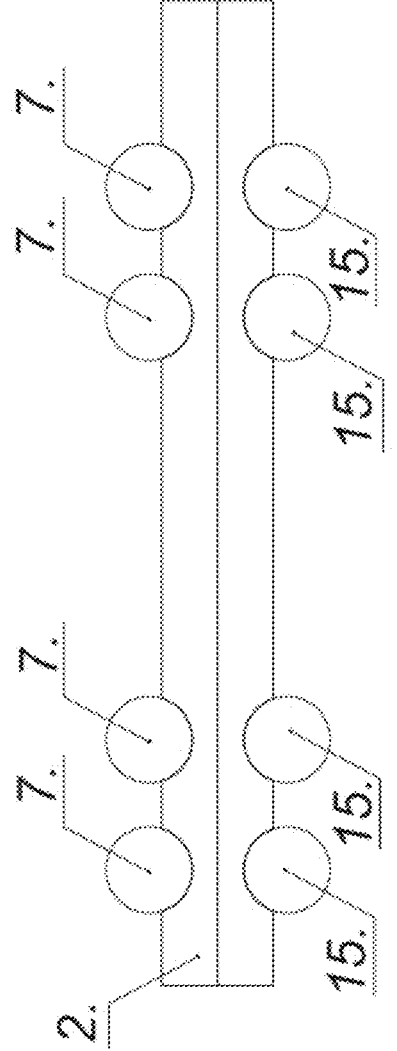
Figure 10:
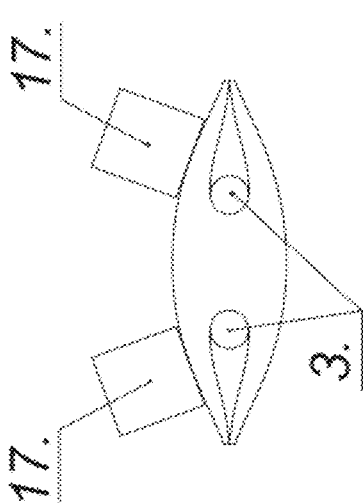
FIG. 10 presents the power and force transfer from the carriage to the flexible cable 2 through two tracks 17 tensioned between the toothed wheels 16.
Figure 10:
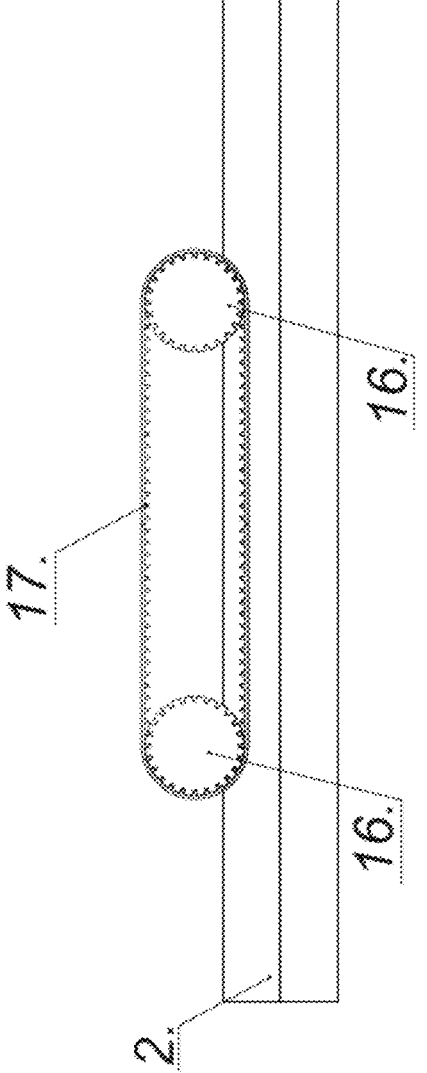

FIG. 9 presents the carriage suspension system with top load bearing, driven rollers 7 and with bottom pressing rollers 15;

FIG. 10 presents power and force transfer from the carriage to the flexible cable 2 via two tracks 17 tensioned between the toothed wheels 16, wherein the tracks 17 move symmetrically against the longitudinal axis of the flexible cable 2, along and on the top surface of flexible cable 2.

Figure 11:
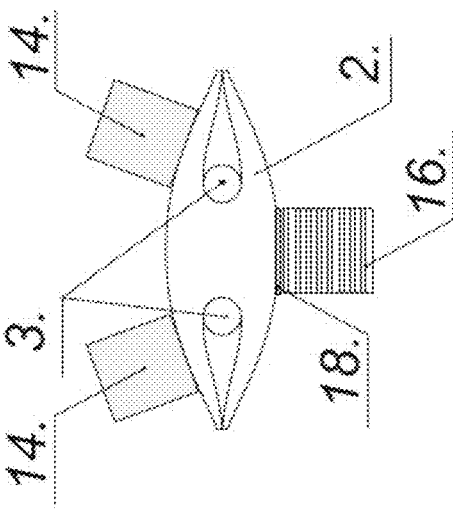
FIG. 11 presents the carriage power transfer through the toothed wheel 16 meshing with the toothed strip 18 integrated into the flexible cable 2 and placed on its bottom surface.
Figure 11:
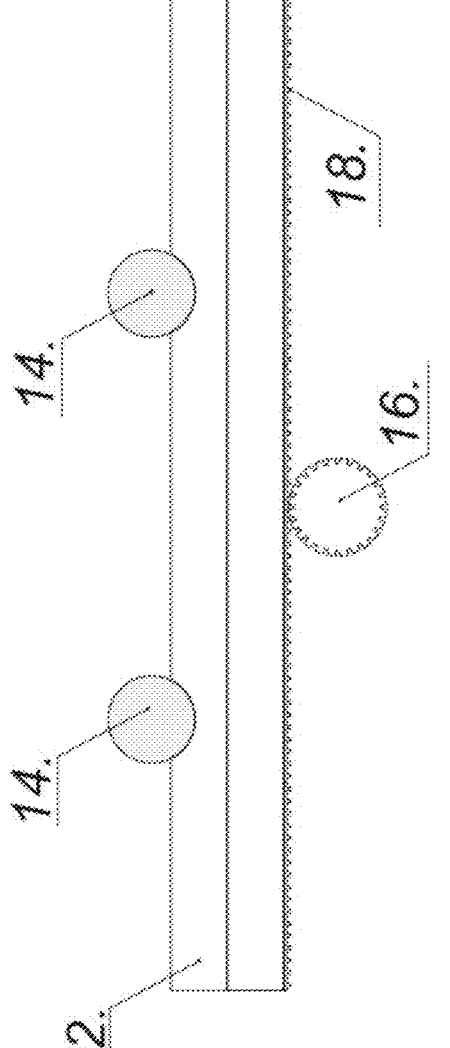

FIG. 11 presents power transfer of the carriage according to the invention, through the toothed wheel 16 meshing with the toothed strip 18 integrated into the flexible cable 2 and placed on its bottom surface.

What is claimed is:

1. A pantograph carriage for collection of electricity from a flexible cable (2), comprising:
    said flexible cable containing at least two conductor wires (3), the at least two conductor wires having a covered part and an uncovered part, the at least two conductor wires are partially moulded into a flexible screen; the flexible screen is configured to form flexible lips (2a) in the uncovered part of conductor wires a load bearing element (11), the load bearing element (11) is equipped with at least two load bearing rollers (7, 14, 16), at least one roller configured to roll across the top surface of the flexible cable (2), and at least two sliding drivers (6) attached to the load bearing element (8, 11), which in their working position enter spaces between the flexible lips (2a) of the flexible cable (2) and touch the conductor wires (3) with their sliding surfaces, and at least one opener (1, 4, 5) is provided in order to open the flexible lips (2a) of the flexible cable (2) in order to form a space, where the sliding drivers (6) enter.

2. A carriage according to claim 1, wherein, the at least one opener (1, 4, 5) is a plate (1) with a blade, the blade having an edge parallel to the longitudinal axis of the flexible cable (2), the blade is inserted between the flexible lips (2a) of the flexible cable (2) and is turned around an axis perpendicular to the plate (1) blade edge, forming space for the sliding drivers to enter.

3. A carriage according to claim 1, wherein the at least one opener (1, 4, 5) is a wedge (4), which is inserted between the flexible lips (2a) of the flexible cable (2) forming a space, to insert the sliding drivers (6).

4. A carriage according to claim 1, wherein the opener (1, 4, 5) is a rotary disc (5), the rotary disk having blades, the sliding drivers are on the rotary disk, the rotary disk is configured to rotate around an axis perpendicular to the plane passing through longitudinal axes of conductor wires (3), such that the rotary disc (5) blades enter between the flexible lips (2a) of the cable (2), forming space for the sliding drivers (6) on the side of the blade opposite to the rotation axis of the rotary disc (5), and the sliding drivers (6) contact the conductor wires (3).

5. A carriage according to claim 1, wherein there are at least two openers (1, 4, 5) for the conductor wire (3), separated at a predetermined distance along the flexible cable (2).

6. A carriage according to claim 1, further comprising scissor arms (8) with at least two load bearing rollers (7, 14, 16) are attached to the load bearing element (11).

7. A carriage according to claim 1, wherein, the load bearing element (11) includes a straight bar (9) with its longitudinal axis perpendicular to the longitudinal axis of the flexible cable (2) and parallel to a plane passing through longitudinal axes of conductor wires (3), wherein two symmetrically movable supports (10) of the at least two load bearing rollers (7, 14, 16) are moving along its longitudinal axis, wherein load bearing rollers (7, 14, 16) are placed at the ends of the supports, such that the at least two load bearing rollers (7, 14, 16) surfaces touch the top surface of the flexible cable (2) once the supports are fully moved in, and when moved out, the entire carriage may be moved downwards.

8. A carriage according to claim 1, wherein the load bearing element (11) includes a rigid frame with a U-shape in the cross-section towards the longitudinal axis of the flexible cable (2), wherein bars comprising axes of the at least two load bearing rollers (7, 14, 16) are attached as rotary elements at the ends of the rigid frame arms, rotating around axes parallel to the longitudinal axis of the flexible cable (2), wherein in the vertical position of these bars with the at least two load bearing rollers (7, 14, 16) it is possible to move the entire carriage downwards, and after bar rotation together with the load bearing rollers (7, 14, 16) towards the flexible cable (2), the at least two load bearing rollers (7, 14, 16) surfaces touch the top surface of the flexible cable (2).

9. A carriage according to claim 1, wherein the load bearing element (11) includes a divided and separable frame with a fixed part (12) and a movable bar (13), wherein axes with load bearing rollers (7, 14, 16) are provided at free ends of arms of both parts (12, 13), such that once the bar (13) is moved away from the frame (12), the entire carriage may be moved down and when pressed together, surfaces of the at least two load bearing rollers (7, 14, 16) touch the top surface of the flexible cable (2).

10. A carriage according to claim 1, wherein the at least two load bearing rollers (7, 14, 16) may be driven rollers (7) or idle rollers (14).

11. A carriage according to claim 1, wherein the carriage is suspended on four symmetric sets of the at least two load bearing rollers including of driven load bearing rollers (7) and idle load bearing rollers (14), with two rollers opposite one another, on both sides of the flexible cable (2), wherein distances between the symmetric load bearing rollers is at least twice the distance between the symmetric driven load bearing rollers and the idle load bearing rollers.

12. A carriage according to claim 1, further comprising bottom pressing rollers, the at least two load bearing rollers are top load bearing rollers, the carriage is suspended on the top load bearing rollers (7, 14, 16) pressed against the flexible cable (2) by the bottom pressing rollers (15), wherein the bottom pressing rollers (15) may be driven rollers or idle rollers.

13. A carriage according to claim 1, wherein the at least two load bearing rollers (7, 14, 16) are a toothed wheel (16) used to transfer power from the carriage to the flexible cable (2) using tracks (17) tensioned between toothed wheels (16), wherein the tracks (17) move symmetrically along the longitudinal axis of the flexible cable (2), along the surface of the flexible cable (2).

14. A carriage according to claim 1, wherein, the flexible screen includes a toothed strip (18), and that the carriage comprises a drive including a toothed wheel (16) meshing with said toothed strip (18) integrated into the flexible cable and placed on its surface.

* * * * *